United States Patent Office 2,734,035
Patented Feb. 7, 1956

2,734,035

DIELECTRIC COMPOSITIONS

Sidney D. Ross, Williamstown, and Irving Kuntz, North Adams, Mass., assignors to Sprague Electric Company, North Adams, Mass., a corporation of Massachusetts No Drawing. Application March 31, 1953,
Serial No. 346,018

4 Claims. (Cl. 252—63.7)

This invention relates to improved dielectric materials and more particularly relates to aliphatic and aromatic dielectric materials and their halogenated derivatives to which relatively small amounts of certain stabilizing agents have been added. It also concerns itself with electrical devices, especially capacitors, in which the metal conductors are insulated with such dielectric compositions.

This application forms a C. I. P. of our copending application entitled "Nitrogen Containing Compounds," Serial No. 248,276, filed September 25, 1951.

The use of stabilizing agents for dielectric materials is not new. In recent years various sources of literature have shown that small additions of certain organic substances to capacitor impregnants have caused marked extension of life of the components, particularly at elevated temperatures. Material such as the quinones, certain nitroaromatic compounds, and anthraquinones have been suggested and have found at least limited use for halogenated organic dielectric materials.

While these inhibitors of stabilizing agents do contribute to improved results when employed in moderate percentages, they are in no way completely successful. When used in amounts insufficient to deleteriously affect the primary dielectric's electric properties, the period of stabilization at any given temperature is somewhat limited and for long life at moderately elevated temperatures results are not satisfactory. When large amounts of the stabilizer are employed the insulation resistance, power factor, dielectric constant and/or melting point may be affected to an extent sufficient to prohibit the use of the composition in high quality capacitors of any given volume and rating.

It is an object of the invention to overcome the foregoing and related disadvantages. A further object is to produce new and useful dielectric compositions. A still further object is to produce new and useful electrical capacitors which may be operated at elevated temperatures for extended periods without failure. Additional objects will become apparent from the following description and claims.

These objects are attained in accordance with the present invention wherein there is produced a dielectric composition comprising a dielectric material selected from the class consisting of aliphatic and aromatic hydrocarbons and halogenated derivatives thereof in which is dissolved from about $\frac{1}{10}$% to about 5% of benzo-(c)-cinnoline or a substituted derivative thereof.

In a more restricted sense the invention is concerned with a dielectric composition comprising chlorinated naphthalene containing about $\frac{1}{10}$% to about 5% benzo-(c)-cinnoline.

The invention is also concerned with electrical capacitors comprising aluminum electrode foils separated by porous dielectric spacing material impregnated with one of the dielectric compositions of this invention.

My invention is based upon the discovery that benzo-(c)-cinnoline, benzo-(c)-cinnoline oxide, and benzo-(c)-cinnoline dioxide, and substituted derivatives thereof, particularly trifluoromethyl derivatives, are especially effective stabilizers for a number of organic dielectric materials including chlorinated naphthalene and biphenyl, synthetic polymers of the isobutylene type, and mineral oil compounds.

A particular advantage of my dielectric compositions is that the insulation resistance at normal and at elevated temperatures is much improved over the insulation resistance of the non-stabilized dielectric material and much higher than with known inhibitors such as azobenzene; the latter has been limited in use because it lowers even the room temperature leakage resistance to a marked degree. A further important advantage resides in the fact that the addition of the stabilizer to the dielectric material greatly increases is operational life in capacitors at elevated temperatures over the non-stabilized dielectric material.

While benzo-(c)-cinnoline itself and its oxides are outstanding materials for use in accordance with my invention, it is also possible to use substituted derivatives thereof in which the benzene nuclei are substituted with alkyl, aralkyl, nitro or other groups selected to modify its solubility characteristics, melting point, etc. The outstanding substituted derivatives of my preferred compounds are the 3,8-bis-(trifluoromethyl)-benzo(c)cinnoline, 3,8-bis-(trifluoromethyl)-benzo(c)cinnoline-5-oxide, and 3,8 - bis - (trifluoromethyl) - benzo(c)cinnoline-5,6-dioxide disclosed in our copending application, Serial No. 248,276, filed September 25, 1951, and now Patent No. 2,643,252.

The dielectric materials stabilized in accordance with the invention as noted above are chlorinated naphthalene, chlorinated biphenyl and various hydrocarbon mineral oils and synthetic polymers. Vegetable oils, such as castor oil, may also be treated. The stabilization is not limited to liquid systems since chlorinated naphthalene wax is effectively stabilized throughout its normal operating range, e. g., up to +85° C., despite the fact that its melting point is in excess of this amount.

The amount of stabilizers employed is ordinarily from about $\frac{1}{10}$% to about 5% by weight of the dielectric material to be treated. Percentages on the order of 1 to 2% are normally employed where optimum electrical properties are desired throughout an extended operating life.

As an illustrative example of the unusual stabilizing characteristics of the compounds of the invention, a number of capacitors were rolled with aluminum foil separated by calendered kraft paper spacing totaling 0.0009" in thickness. A third of the capacitors were impregnated with chlorinated napthalene wax to a capacity of approximately $\frac{1}{10}$ mfd. and in this construction the normal voltage rating was 400 VDC. An additional third of the capacitors were impregnated with chlorinated naphthalene wax containing 1% by weight of benzo-(c)-cinnoline and the final third was impregnated with chlorinated naphthalene wax containing 1% by weight of benzo-(c)-cinnoline oxide.

The three groups of capacitors were life tested according to standard practice at 600 VDC in an ambient temperature of 85° C. At the end of 170 hours four of the twelve control units impregnated with the untreated chlorinated naphthalene wax had failed. In sharp contrast to this, at the end of 400 hours none of the capacitors impregnated with chlorinated naphthalene wax containing 1% of the benzo-(c)-cinnoline had failed and after 2000 hours only 3 of the 12 units had failed with the failures occurring at the hours of 455, 710 and 1290. The third set of capacitors impregnated with naphthalene wax containing 1% of benzo-(c)-cinnoline oxide showed 4 failures in 12 units after 1300 hours on test at 85° C. which failures occurred at the hours of 696, 926, 942 and 1100.

As a matter of interest the insulation resistance of the capacitors impregnated with the benzo-(c)-cinnoline and benzo-(c)-cinnoline oxide stabilized chlorinated naphthalene wax averaged over twice the initial insulation resistance of the non-stabilized capacitors at room temperature and maintained this ratio after life test.

The use of benzo-(c)-cinnoline and its oxides is not restricted to temperatures of 85° C. as, for example, polyisobutylene with an average molecular weight of about 3000 may be utilized as a paper capacitor impregnant for service at 125 to 150° C., provided that .1 to 5% of one of the above disclosed stabilizers is employed. Mineral oils have likewise been suitable for high temperature capacitors when provided with the inhibitors of the invention. As previously pointed out, any solubility problems may be eliminated by appropriate substitution of one or more benzene nuclei of the benzo-(c)-cinnoline compounds. The preferred combination of the invention, namely the use of benzo-(c)-cinnoline and its oxides with chlorinated naphthalene wax, is characterized by extreme life under electrical load, at normal and elevated operational temperatures, sufficiently high insulation resistance, and remarkable ability to stabilize against outside contaminates introduced through manufacturing or use of the dielectric spacing material.

As many apparently widely different embodiments of this invention may be made without departing from the spirit and scope hereof, it is to be understood that the invention is not limited to the specific embodiments hereof except as defined in the appended claims.

What is claimed is:

1. A dielectric composition consisting essentially of chlorinated naphthalene wax containing about $\frac{1}{10}\%$ to about 5% benzo-(c)-cinnoline.

2. A dielectric composition consisting essentially of chlorinated naphthalene wax containing about $\frac{1}{10}\%$ to about 5% benzo-(c)-cinnoline oxide.

3. A dielectric composition consisting essentially of a chlorinated aromatic hydrocarbon containing about $\frac{1}{10}\%$ to about 5% benzo-(c)-cinnoline dioxide.

4. A dielectric composition consisting essentially of a chlorinated aromatic hydrocarbon having admixed therewith from about .1% to about 5% of a stabilizer selected from the class consisting of benzo-(c)-cinnoline, benzo-(c)-cinnoline oxide, benzo-(c)-cinnoline dioxide, and trifluoromethyl substituted derivatives thereof.

References Cited in the file of this patent

FOREIGN PATENTS 500,641     Great Britain _____ May 6, 1937